(12) United States Patent
Hsieh et al.

(10) Patent No.: US 10,263,549 B2
(45) Date of Patent: Apr. 16, 2019

(54) DRIVING DEVICE WITH STEPPER MOTOR

(71) Applicant: TDCM CORPORATION LIMITED, Taoyuan (TW)

(72) Inventors: Hsiang-Chih Hsieh, Taoyuan (TW); Hung-Yi Tseng, Taoyuan (TW); Jui-Hsiang Huang, Taoyuan (TW)

(73) Assignees: TDCM Corporation Limited, Taoyuan (TW); Tong Yang Industry Co., Ltd., Tainan (TW)

( * ) Notice: Subject to any disclaimer, the term of this patent is extended or adjusted under 35 U.S.C. 154(b) by 0 days.

(21) Appl. No.: 14/923,778

(22) Filed: Oct. 27, 2015

(65) Prior Publication Data

US 2017/0117836 A1 Apr. 27, 2017

(51) Int. Cl.
*H02P 8/38* (2006.01)
*H02K 7/116* (2006.01)

(52) U.S. Cl.
CPC ............... *H02P 8/38* (2013.01); *H02K 7/116* (2013.01)

(58) Field of Classification Search
CPC .................................. H02P 8/38; H02K 7/116
USPC .......................................................... 318/696
See application file for complete search history.

(56) References Cited

U.S. PATENT DOCUMENTS

| 5,546,941 A * | 8/1996 | Zeimer | A61B 3/16 |
| | | | 600/398 |
| 2004/0115014 A1* | 6/2004 | Totsu | B25B 23/14 |
| | | | 408/199 |

* cited by examiner

*Primary Examiner* — Kawing Chan
(74) *Attorney, Agent, or Firm* — Rosenberg, Klein & Lee

(57) ABSTRACT

A driving device includes a case with a cover mounted thereto. A transmission device is received in the case and has a stepper motor and a gear reduction unit which includes multiple gears engaged with each other. The stepper motor drives the gear reduction unit which is connected to an object. A circuit board is connected with the transmission device and provides power to the stepper motor and controls the stepper motor. A sensing device has a sensor and a detector which is connected to one of the gears of the gear reduction unit. When the gear reduction unit drives the detector to pass the sensor, the sensor sends a signal to the circuit board which keeps on providing the power to the stepper motor. When no signal is sent to the circuit board by the sensor, the circuit board cuts off the power to the stepper motor.

5 Claims, 18 Drawing Sheets

DRIVING DEVICE WITH STEPPER MOTOR

BACKGROUND OF THE INVENTION

1. Fields of the Invention

The present invention relates to a driving device, and more particularly, to a driving device with a stepper motor wherein the rotation signal of a gear is sent to a sensing device to protect the stepper motor and the circuit board.

2. Descriptions of Related Art

Motors are used to transfer electric energy into mechanical energy which generates power to drive appliances which can be heavy equipment or small toys. Therefore are different types of motors and one of the motors that we use is the stepper motor which divides a full revolution into a number of equal steps so as to precisely control the positions and speed of the object or product that is cooperated with the stepper motor.

The conventional driving device using the stepper motor generally comprises a circuit board, a stepper motor, a gear reduction unit and an output gear, the circuit board controls the stepper motor to drive a product via the gear reduction unit and the output gear. The conventional driving device using the stepper motor is able to move the product up and down, or left and right.

One of the conventional driving device that moves the product up and down comprises a case in which a transmission driving device is received. The transmission device has a stepper motor, a driving gear, a passive gear and a shaft, wherein the stepper motor is connected with a worm rod and the driving gear is engaged with the worm rod. A transmission gear is connected beneath the driving gear, the passive gear is engaged with the transmission gear of the driving gear. The transmission gear has a threaded hole, the shaft has a threaded section which is threadedly extends through the threaded hole of the transmission gear. A notch is defined in one end of the shaft. The circuit board is connected to the transmission device and has a variable resistance that is slidably connected to the circuit board. The variable resistance has a movable guide rod which is engaged with the notch of the shaft. A cover is mounted to the case.

The driving device is used to adjust the headlight projection angle, thanks to the engagement between the gears, a less noise is generated and the transmission action is smooth and stable. However, the driving device adjusts the headlight is controlled by the stepper motor which is powered by the circuit board and drives the gears clockwise or counter clockwise. Nevertheless, there is not any response or feedback created from the gears so that even if the gears work under abnormal situations, the circuit board still drives the stepper motor. Therefore, the circuit board and the stepper motor may be damaged.

One of the conventional driving device that moves a window or door left and right comprises a case, a gear motor unit, a transmission rod unit and a rack, wherein the case receives the gear motor unit therein. A seat is connected to the case so as to be connected with a switch which is used to controls the manual switch function of the transmission rod unit. The gear motor unit comprises a motor and a gear reduction unit which is driven by the motor. The gear reduction unit has a first gear rod, at least one middle gear rod and a second gear rod, all of which are connected to each other by gears. The transmission rod unit has an upper socket connected to the seat so as to connect the transmission rod unit to the case. The upper socket has a room in one side thereof, and a hole is defined in the other side of the upper socket. The hole communicates with the room. A rear gear rod has a first engagement portion on one end thereof. One of the gears of the rear gear rod is engaged with the gear of the second gear rod. A clutch member has a second engagement portion so as to be engaged with the first engagement portion. A stop and a slot are located at one side of the clutch member and close to the second engagement portion. The stop is pushed by a guide face of the switch so as to move the clutch member. The other side of the clutch member is located in the room of the upper socket. The clutch member has a third engagement portion. A resilient member is biased between the rear gear rod and the clutch member. A front shaft has a fourth engagement portion at one end thereof so as to be engaged with the third engagement portion. A guide gear is pivotably connected to the front shaft and has a main gear. The rack is fixed to a dragging member so as to be engaged with the main gear.

Again, there is not any response or feedback created from the gears so that even if the gears work under abnormal situations, the circuit board still drives the motor. Therefore, the circuit board and the motor may be damaged.

The present invention intends to provide a driving device with a stepper motor to eliminate the shortcomings mentioned above.

SUMMARY OF THE INVENTION

The present invention relates to a driving device and comprises a case having a room defined therein. A cover is mounted to the top of the case. A transmission device is received in the room and has a stepper motor and a gear reduction unit which includes multiple gears engaged with each other at different ratios of gears. The stepper motor drives the gear reduction unit which is connected to an object. A circuit board is received in the room and connected with the transmission device. The circuit board provides power to the stepper motor and controls the speed of the stepper motor.

A sensing device has a sensor and at least one detector, wherein the sensor is connected to the circuit board, and the at least one detector is connected to one of the gears of the gear reduction unit. When the gear reduction unit drives the at least one detector to pass the sensor, the sensor sends a signal to the circuit board and the circuit board keeps on providing the power to the stepper motor. When the gears of the gear reduction unit stop, no signal is sent to the circuit board by the sensor, the circuit board cuts off the power to the stepper motor.

Preferably, the sensor and the detector are mutually operated by magnetic induction.

Preferably, the sensor and the at least one detector are operated by magnetic induction. One of the gears of the gear reduction unit has at least one hole in which the at least one detector is installed. The at least one detector is made by magnetic material. The at least one detector is threadedly connected to a threaded portion of the at least one hole.

Preferably, the sensor and the detector are mutually operated by optical induction.

Preferably, the sensor is a press type sensor. The at least one gear of the gear reduction unit has at least one detector which is a rib-shaped detector and protrudes from one side of the at least one gears. The at least one detector faces the sensor. When the gears of the gear reduction unit are rotated, the at least one detector presses the sensor and the sensor sends a signal to the circuit board.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
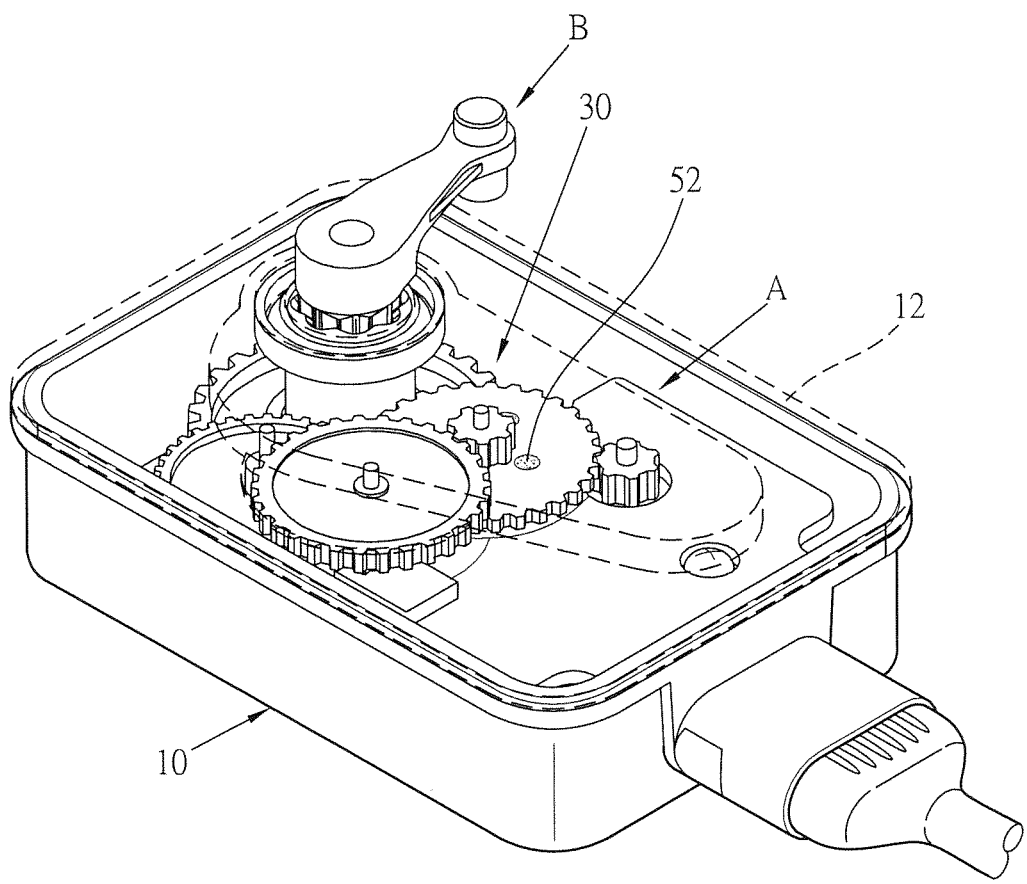
FIG. 1 is a perspective view to show the driving device of the present invention.
Figure 2:
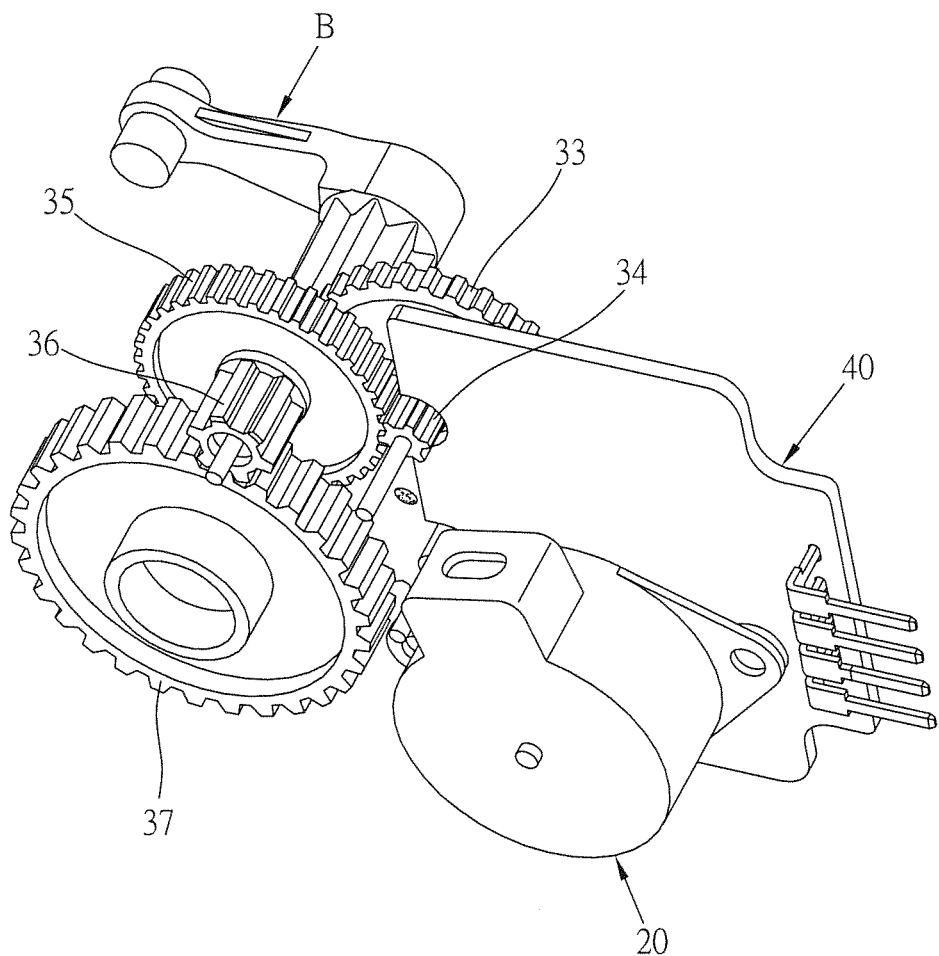
FIG. 2 is another perspective view to show the driving device of the present invention.
Figure 3:
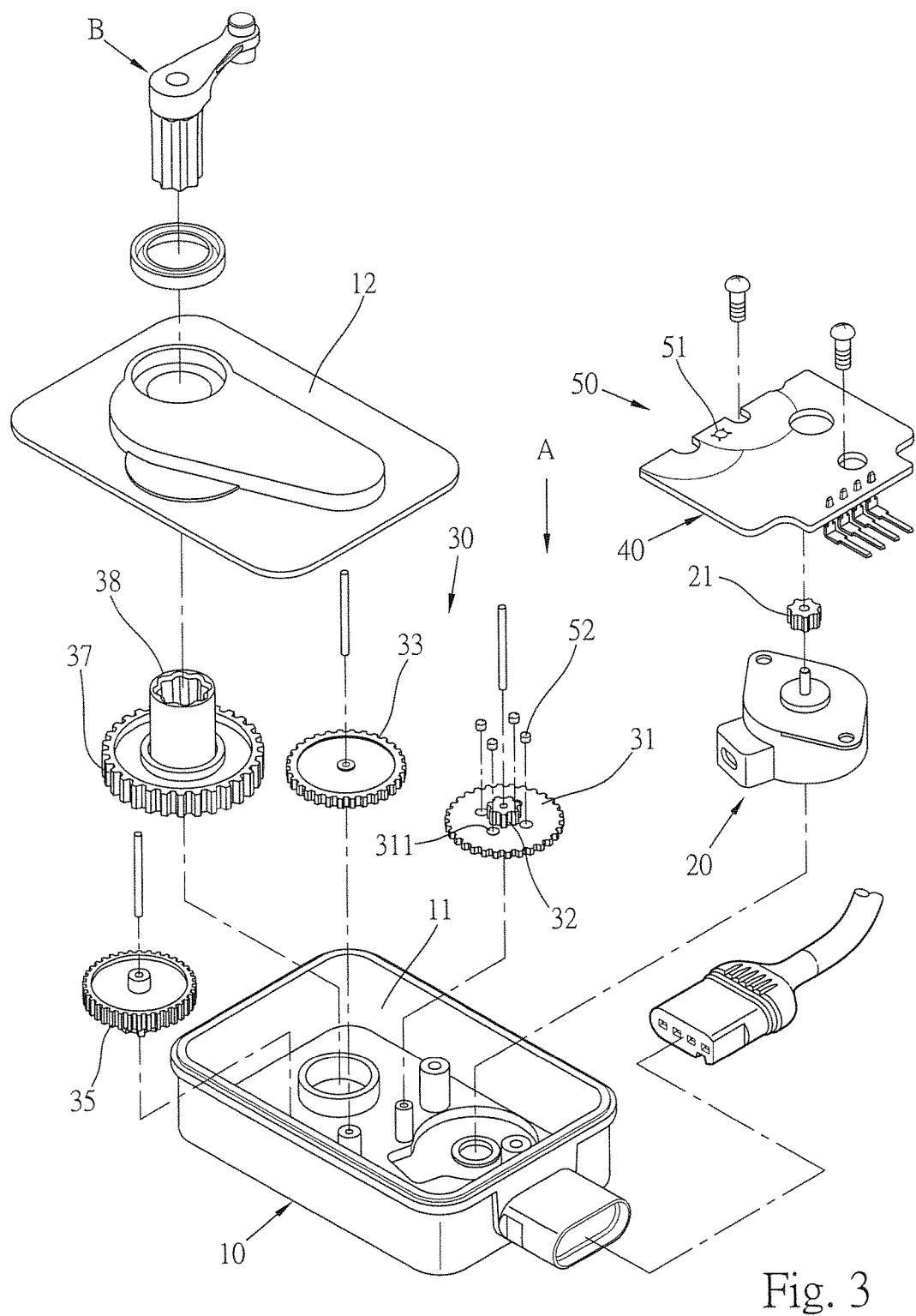
FIG. 3 is an exploded view of the driving device of the present invention.
Figure 4:
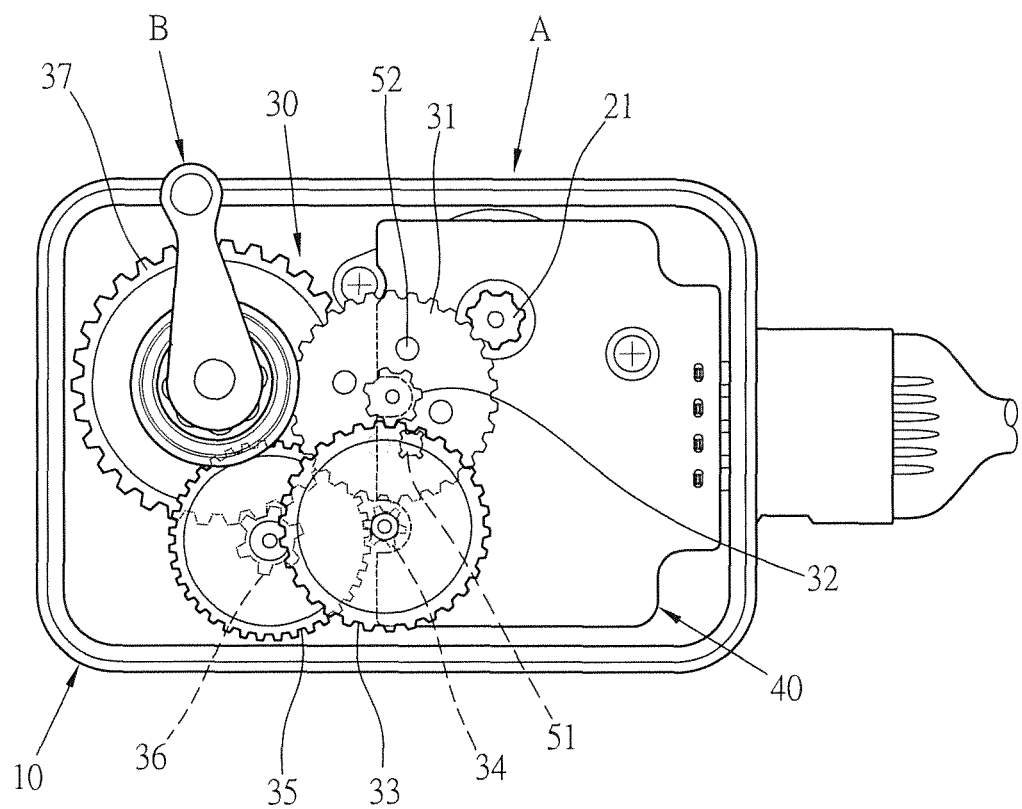
FIG. 4 is a top view of the driving device of the present invention.

Referring to FIGS. 1 to 7, the driving device of the present invention comprises a case 10, a transmission device "A" and a circuit board 40. The case 10 has a room 11 defined therein, and a cover 12 is mounted to the top of the case 10.

The transmission device "A" is received in the room 11 and comprises a stepper motor 20, a gear reduction unit 30 and an output member 38. The stepper motor 20 is connected to a driving gear 21. The gear reduction unit 30 includes a first gear 31, a second gear 32, a third gear 33, a fourth gear 34, a fifth gear 35, a sixth gear 36 and a seventh gear 37. The second gear 32 is smaller than the first gear 32 and co-axially connected with the first gear 31. The first gear 31 is engaged with the driving gear 21. The second gear 32 is engaged with the third gear 33 which is connected axially with the fourth gear 34 which is smaller than the third gear 33. The fourth gear 34 is engaged with the fifth gear 35 which is connected axially with the sixth gear 36 which is smaller than the fifth gear 35. The sixth gear 36 is engaged with the seventh gear 37 which is axially connected to the output member 38. The output member 38 extends through the cover 12 and is connected with an object "B". By the different ratios of gears, the operation speed of the stepper motor 20 can be reduced, and the output member 38 drives the object "B" at separately steps or positions.

The circuit board 40 is received in the room 11 and connected with the transmission device "A". The circuit board 40 provides power to the stepper motor 20 and controls the speed of the stepper motor 20.

A sensing device 50 includes a sensor 51 and at least one detector 52. The sensor 51 is connected to the circuit board 40 and located close to the first gear 31. The first gear 31 has multiple holes 311 spaced from each other, and each of the holes 311 has one detector 52 connected thereto. When the gear reduction unit 30 drives the first gear 31, and the detectors 52 pass the sensor 51, the sensor 51 sends a signal to the circuit board 40 and the circuit board 40 keeps on providing the power to the stepper motor 20. On the contrary, when the gears of the gear reduction unit 30 stop, no signal is sent to the circuit board by the sensor 51, the circuit board 40 cuts off the power to the stepper motor 20 so as to protect the stepper motor 20 and the circuit board 40. The detectors 52 are made by magnetic material. The sensor 51 and the detector 52 are mutually operated by magnetic induction. Alternatively, the sensor 51 and the detector 52 are mutually operated by optical induction.

The circuit board 40 controls the operation speed of the stepper motor 20, wherein the speed of the stepper motor 20 is reduced by the gear reduction 30, and the output member 38 drives the object "B" to be positioned/moved or rotated in multiple steps.

When in assembly, the stepper motor 20, the gear reduction unit 30 and the circuit board 40 are received in the room 11 of the case 10, and the circuit board 40 is connected to the stepper motor 20. The sensor 51 is connected to the circuit board 40. The detectors 52 are connected to the first gear 31 which is engaged with the driving gear 21. The second gear 32 is engaged with the third gear 33. The fourth gear 34 is engaged with the fifth gear 35. The sixth gear 36 is engaged with the seventh gear 37. The output member 38 extends through the cover 12 and is connected with the object "B".

Figure 5:
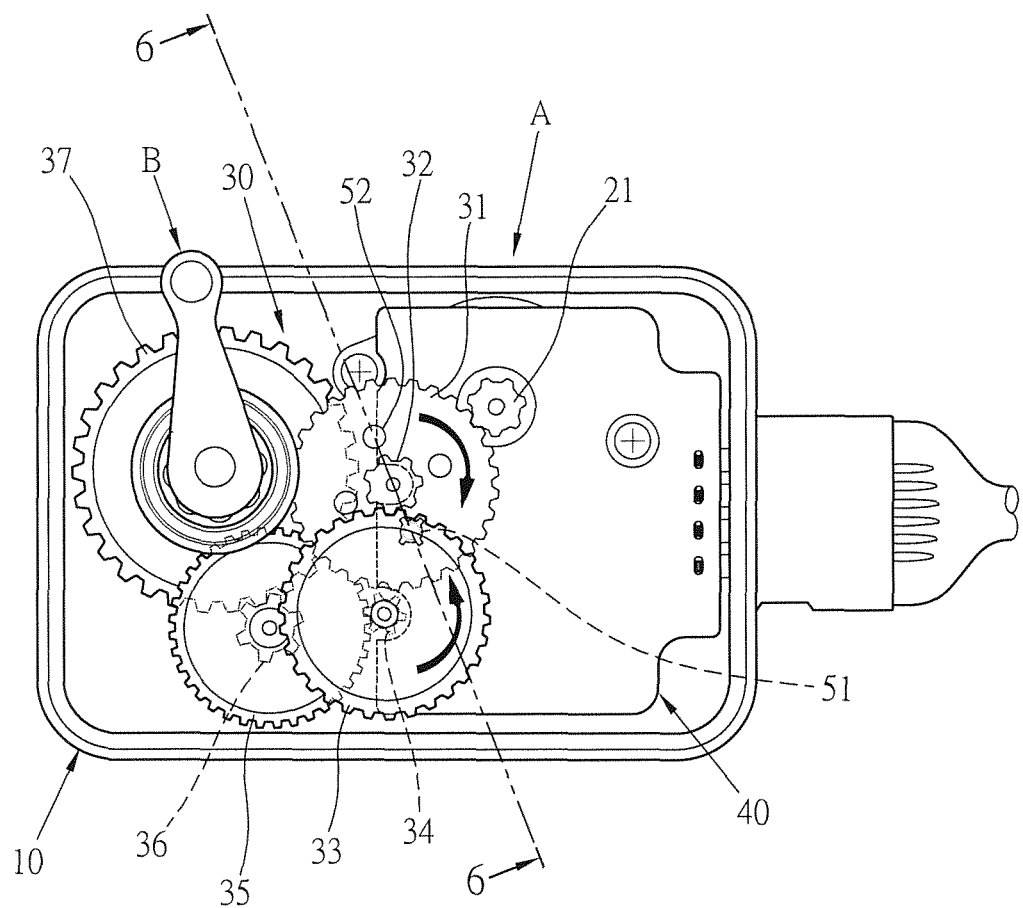
FIG. 5 is a top view of the driving device of the present invention when the driving device is in operation.
Figure 6:
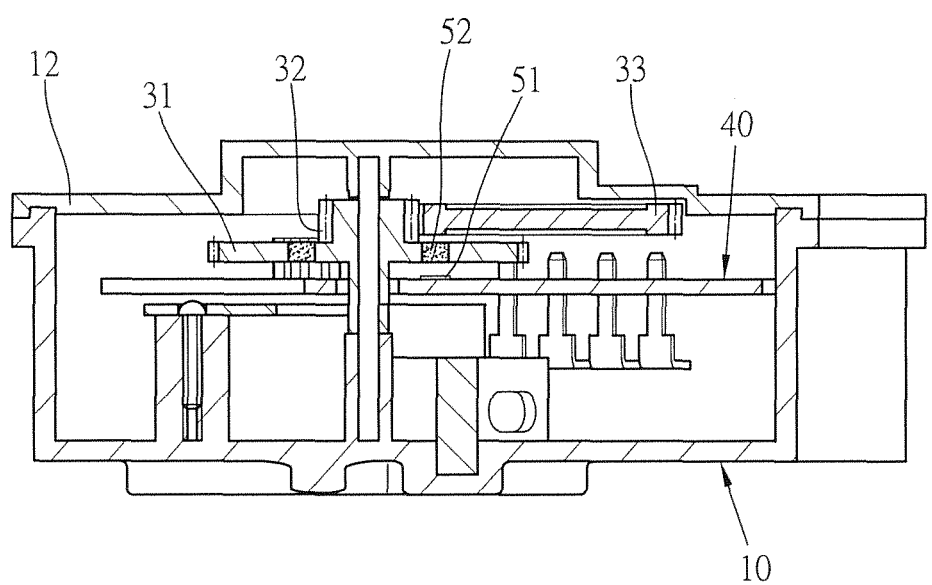
FIG. 6 is a cross sectional view of the driving device of the present invention.
Figure 7:
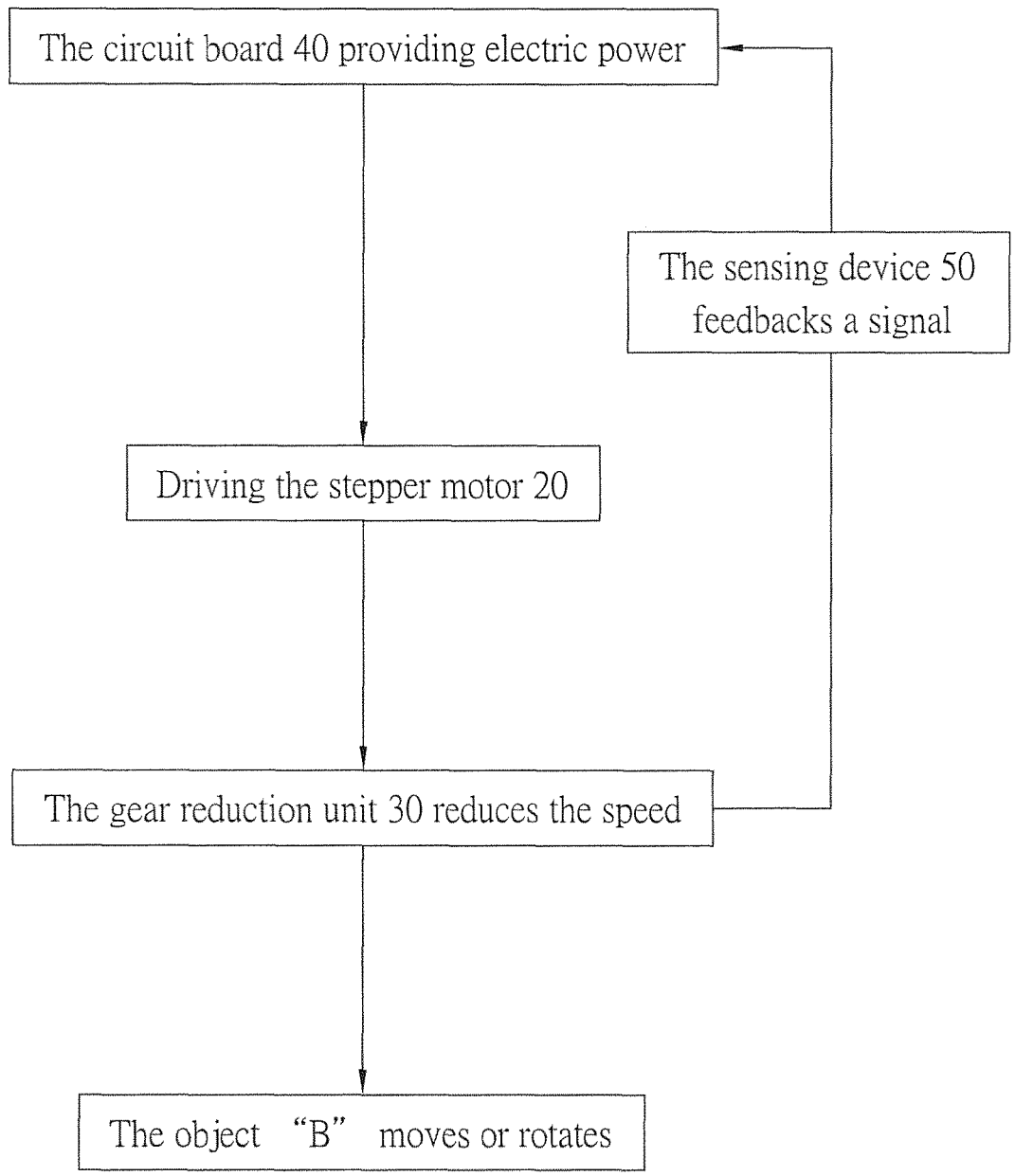
FIG. 7 shows the operation steps of the driving device of the present invention.

As shown in FIGS. 5 to 7, when in operation, the speed of the stepper motor 20 is reduced by the gear reduction 30, and the output member 38 drives the object "B" to be positioned/moved or rotated in multiple steps. When the gear reduction unit 30 drives the first gear 31, and the detectors 52 pass the sensor 51, the sensor 51 sends a signal to the circuit board 40 and the circuit board 40 keeps on providing the power to the stepper motor 20. On the contrary, when the gears of the gear reduction unit 30 stop, no signal is sent to the circuit board by the sensor 51, the circuit board 40 cuts off the power to the stepper motor 20 so as to protect the stepper motor 20 and the circuit board 40.

Figure 8:
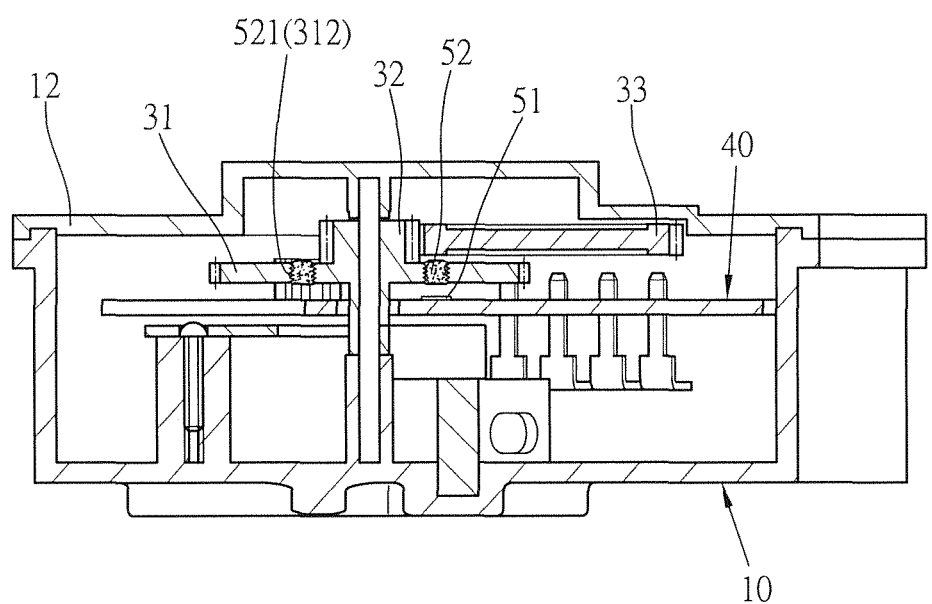
FIG. 8 is a cross sectional view of the second embodiment of the driving device of the present invention.

As shown in FIG. 8 which shows the second embodiment of the present invention wherein each of the detectors 52 has a threaded portion 521 which is threadedly connected to the threaded portion 312 of the hole 311. The distance between the sensor 51 and the detector 52 is therefore able to be adjusted to increase the induction feature.

Figure 9:
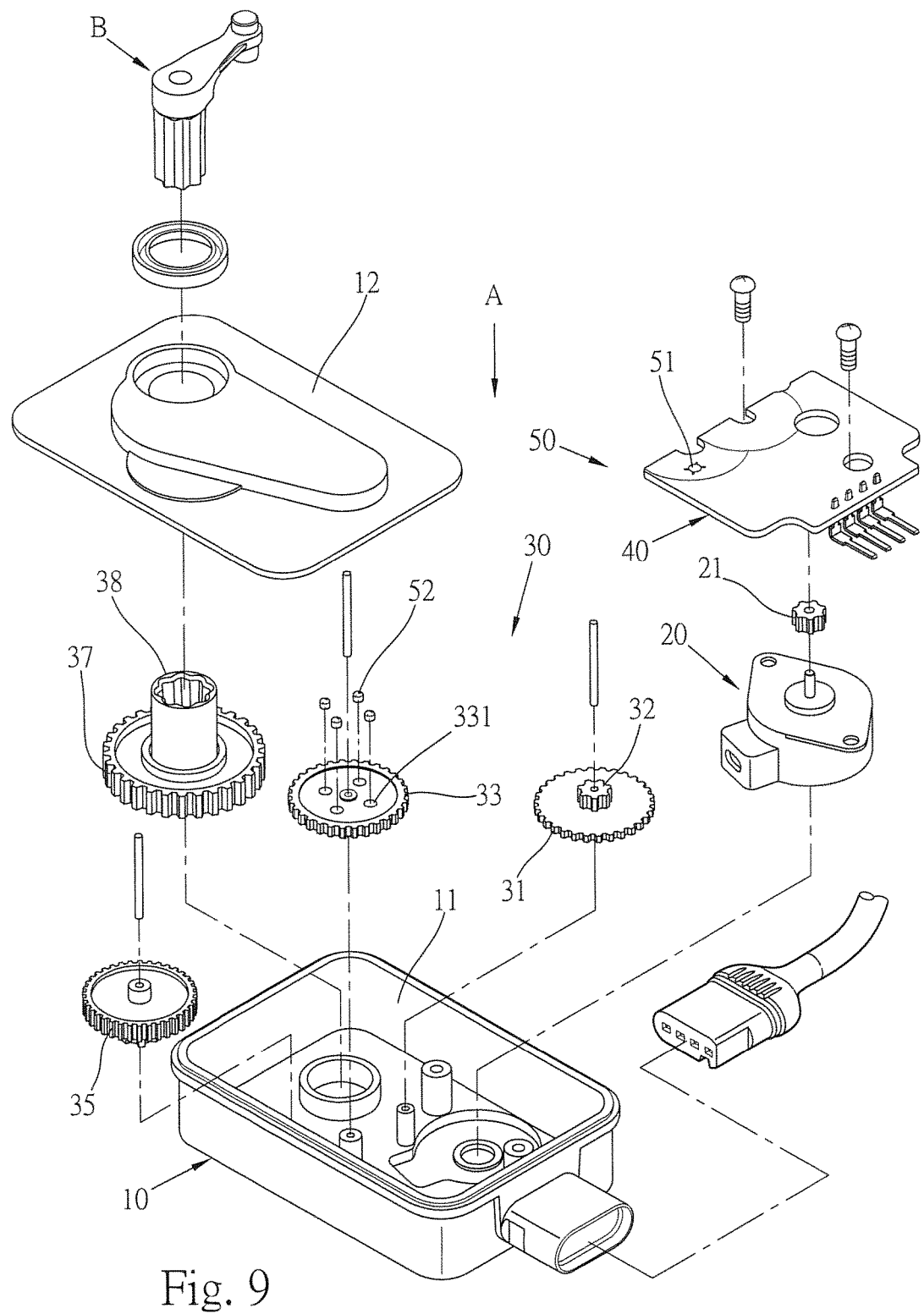
FIG. 9 is an exploded view of the third embodiment of the driving device of the present invention.
Figure 10:
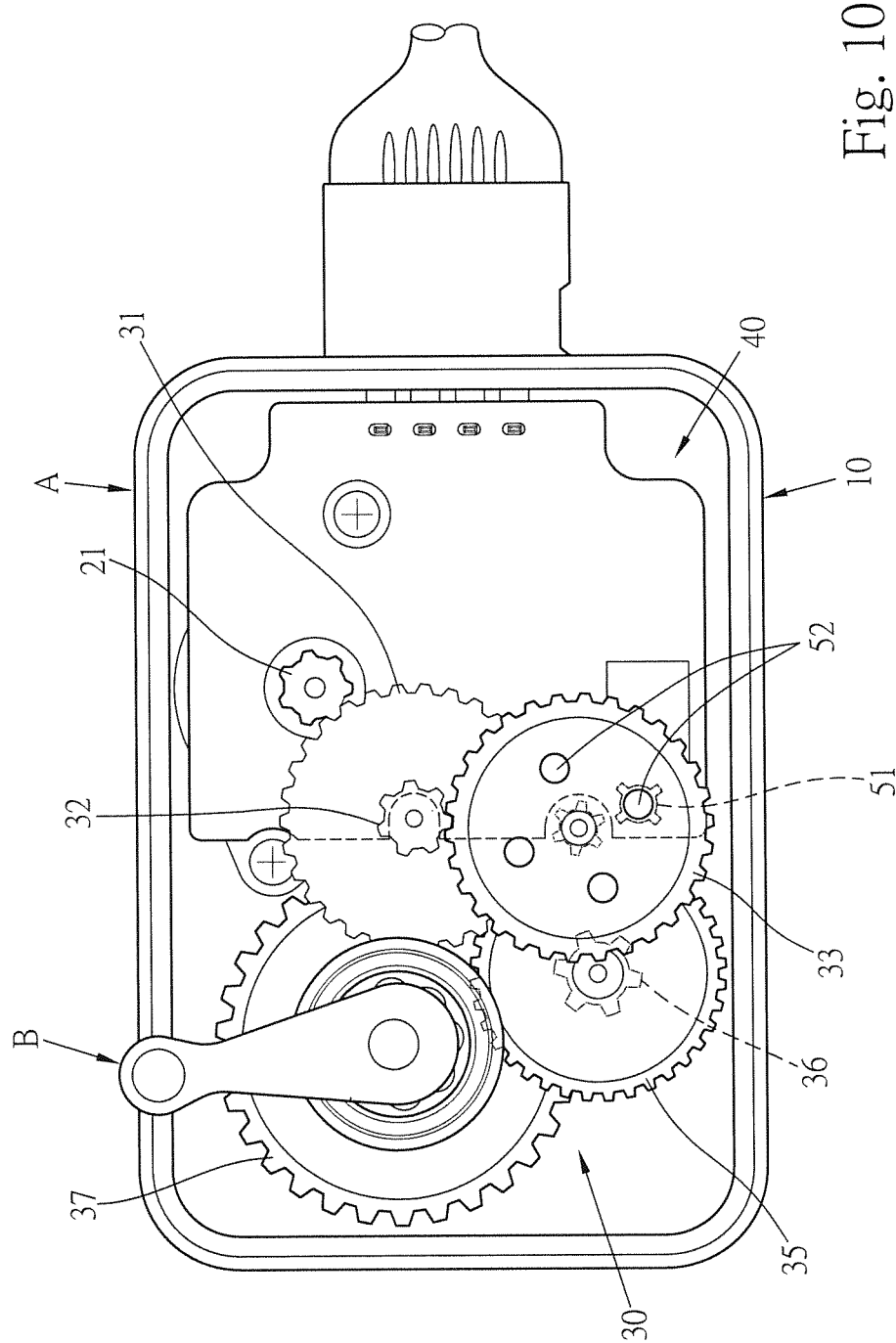
FIG. 10 is a top view of the third embodiment of the driving device of the present invention.

As shown in FIGS. 9 and 10 which show the third embodiment of the present invention wherein the third gear 33 has multiple holes 331 spaced from each other, and each of the holes 331 has one detector 52 connected thereto. When the gear reduction unit 30 drives the third gear 33, and the detectors 52 pass the sensor 51, the sensor 51 sends a signal to the circuit board 40 and the circuit board 40.

Figure 11:
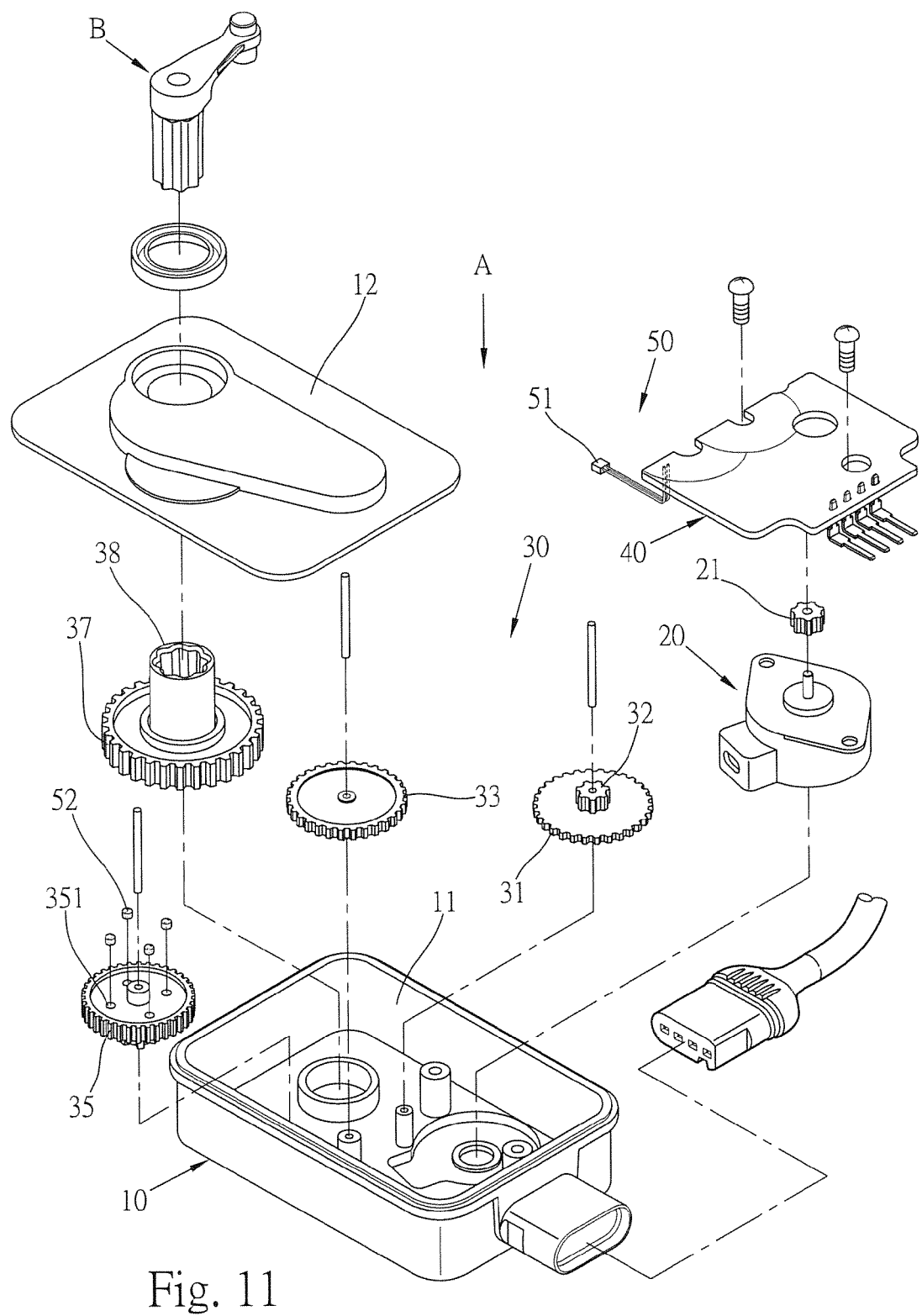
FIG. 11 is an exploded view of the fourth embodiment of the driving device of the present invention.
Figure 12:
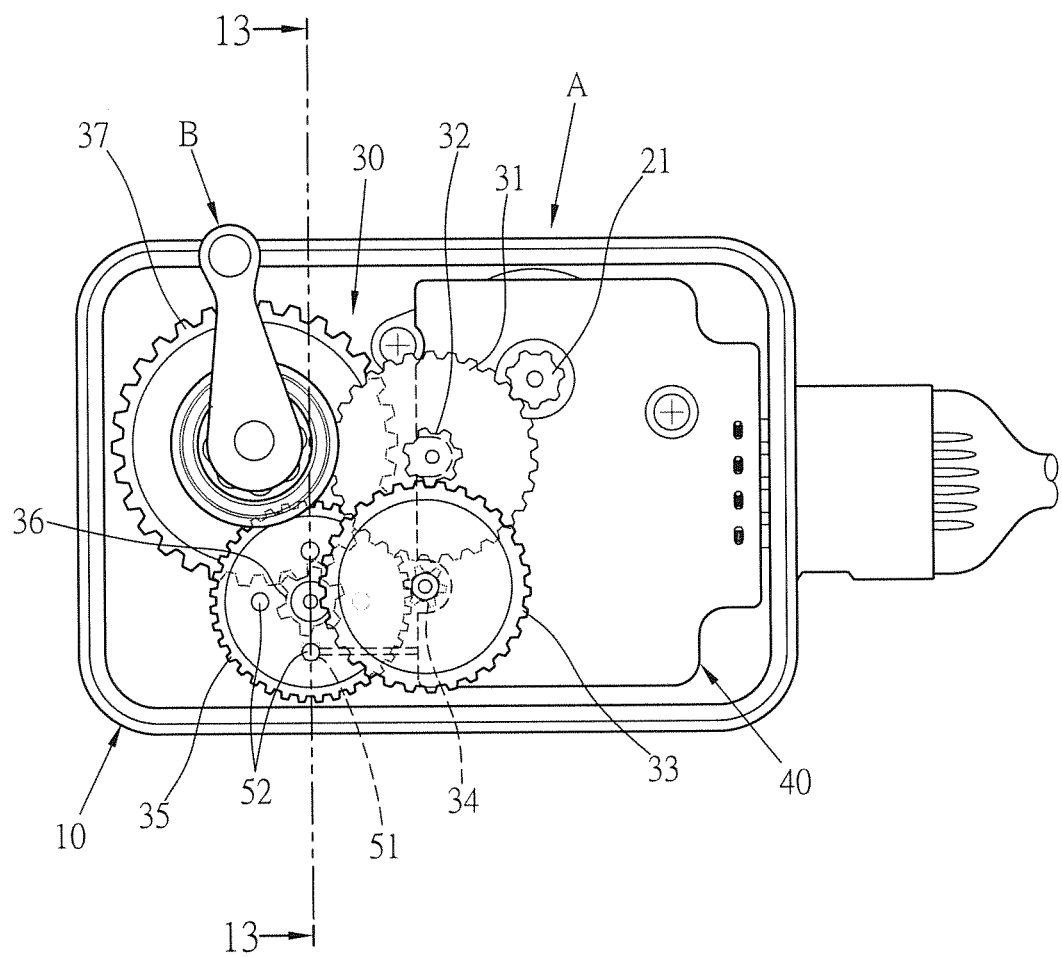
FIG. 12 is a top view of the fourth embodiment of the driving device of the present invention.
Figure 13:
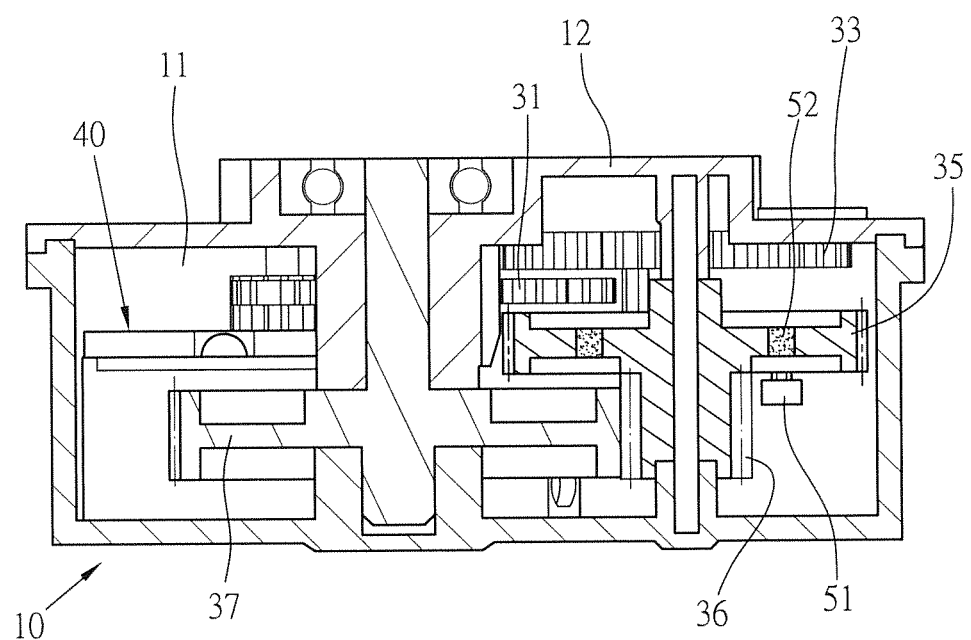
FIG. 13 is a cross sectional view of the fourth embodiment of the driving device of the present invention.

As shown in FIGS. 11 and 13 which show the fourth embodiment of the present invention wherein the sensor 51 is connected to the circuit board 40 by a wire 511 so that the sensor 51 is positioned at a desired position in the room 11. The fifth gear 35 has multiple holes 351 spaced from each other, and each of the holes 351 has one detector 52 connected thereto. When the gear reduction unit 30 drives the fifth gear 35, and the detectors 52 pass the sensor 51, the sensor 51 sends a signal to the circuit board 40 and the circuit board 40.

Figure 14:
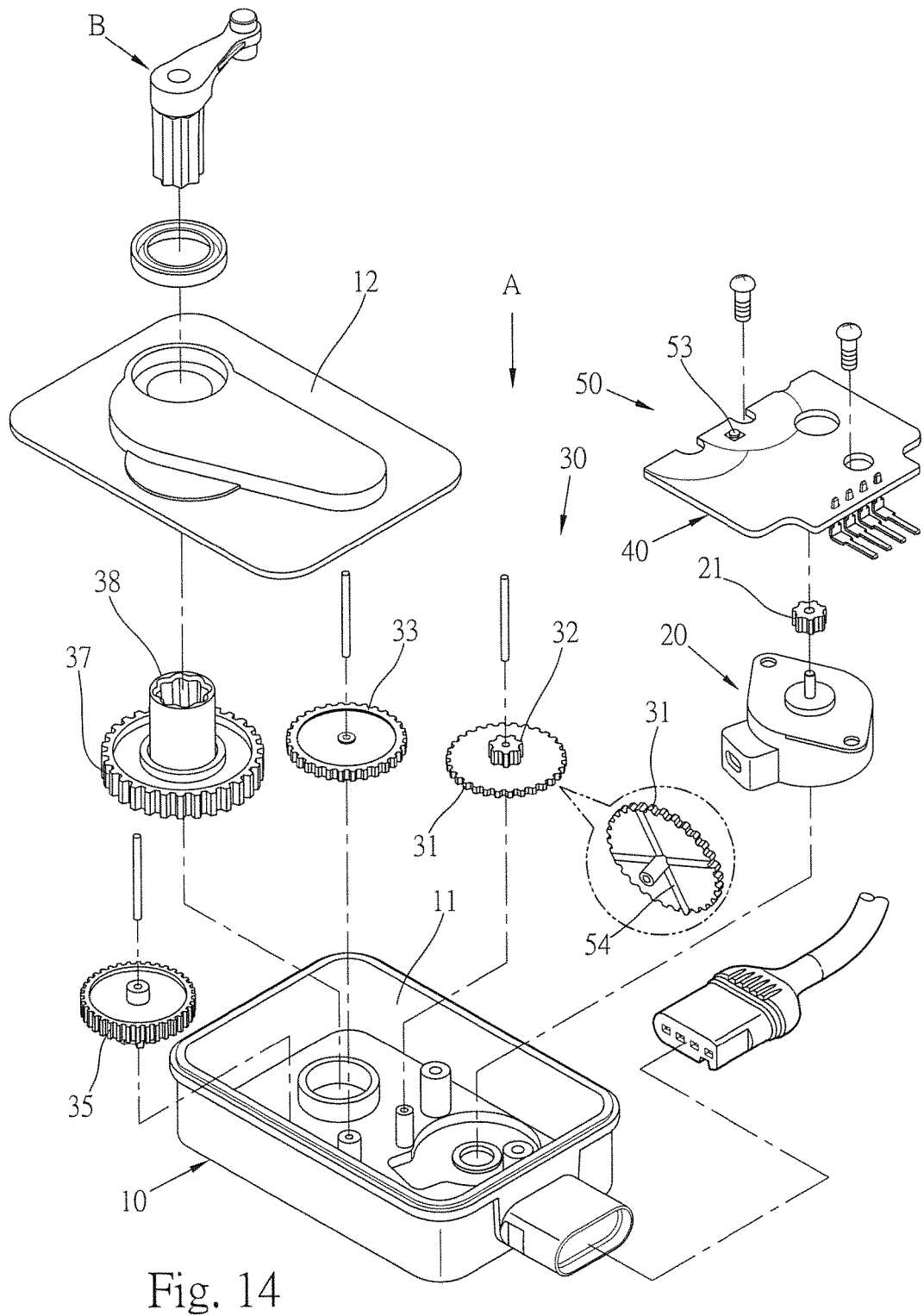
FIG. 14 is an exploded view of the fifth embodiment of the driving device of the present invention.
Figure 15:
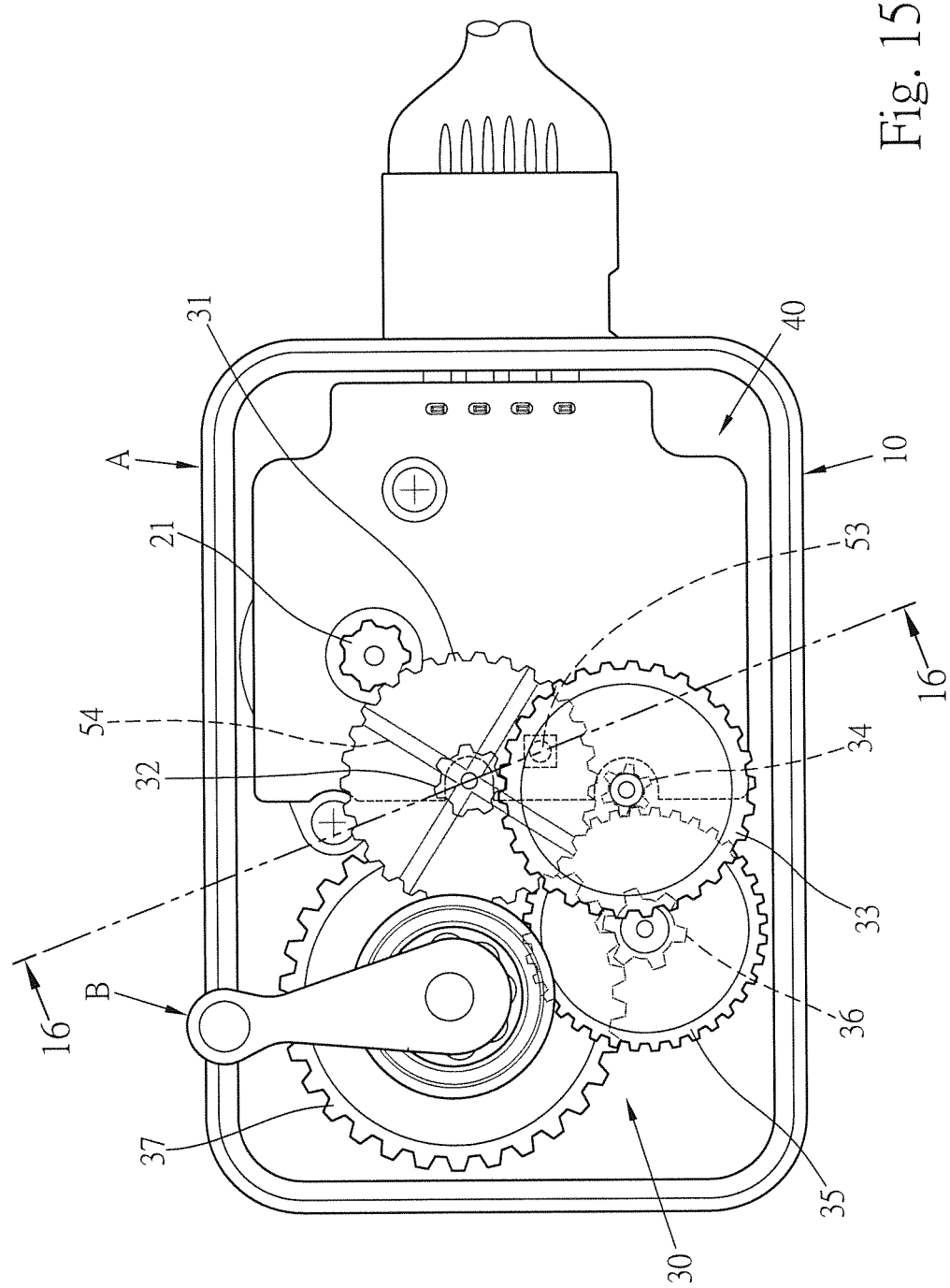
FIG. 15 is a top view of the fifth embodiment of the driving device of the present invention.
Figure 16:
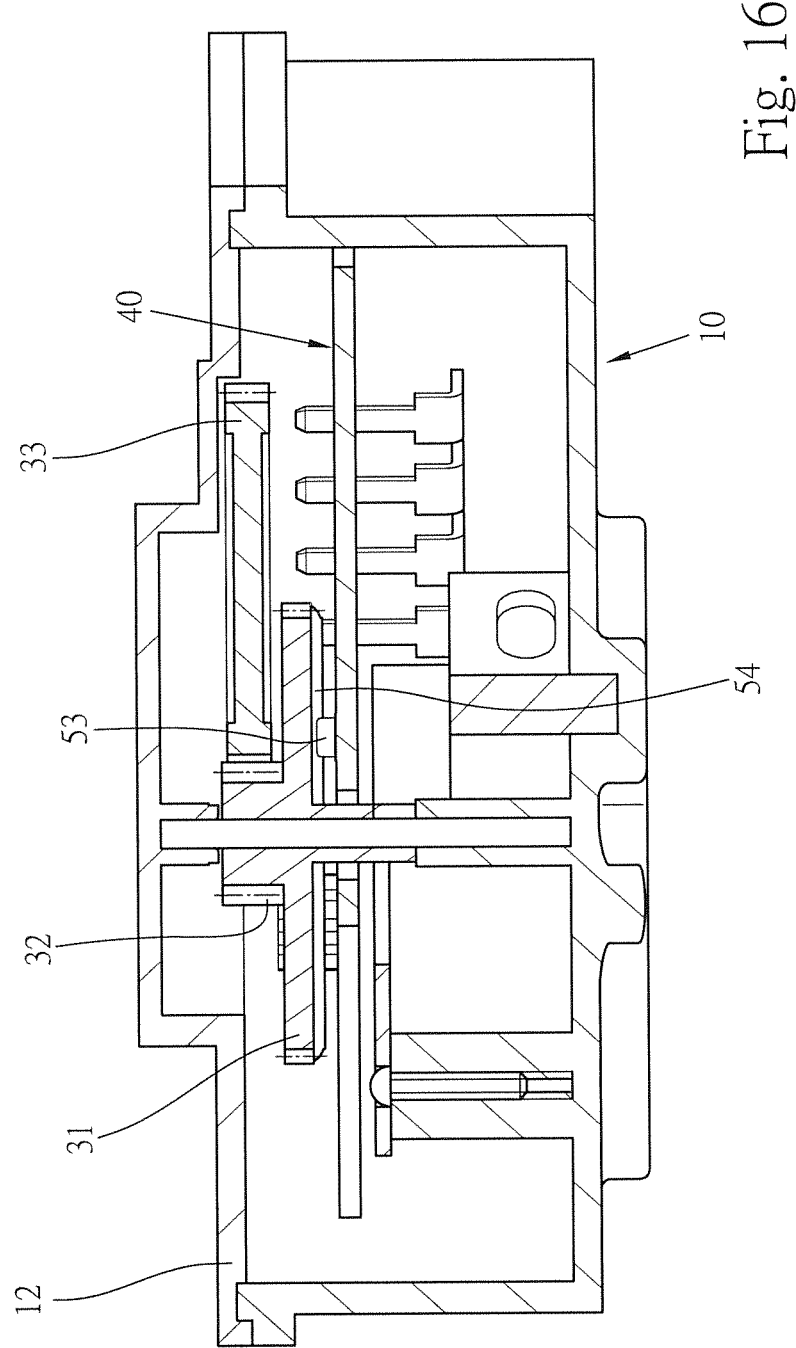
FIG. 16 is a cross sectional view of the fifth embodiment of the driving device of the present invention.
Figure 17:
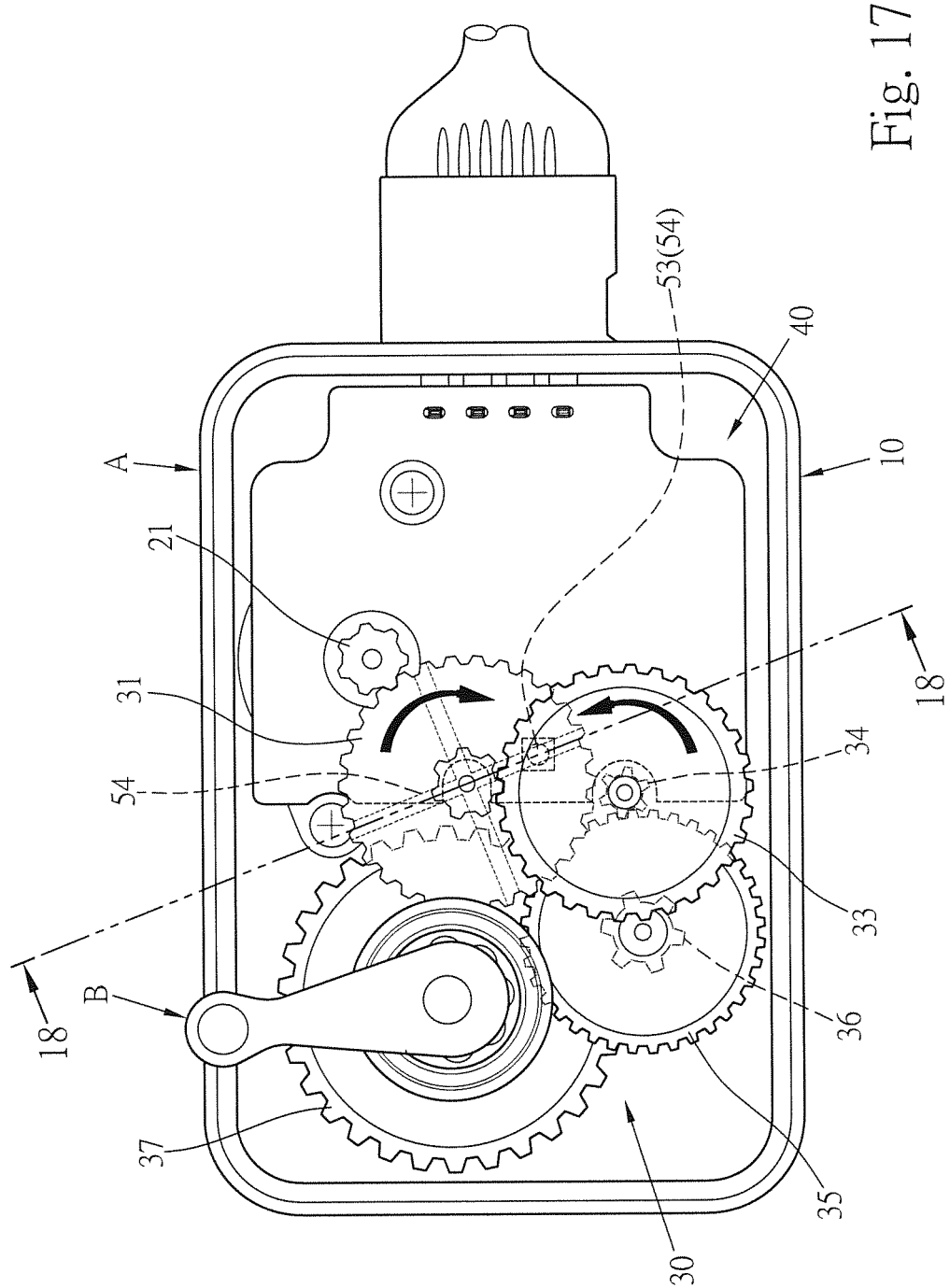
FIG. 17 is a top view of the fifth embodiment of the driving device of the present invention when the driving device is in operation.
Figure 18:
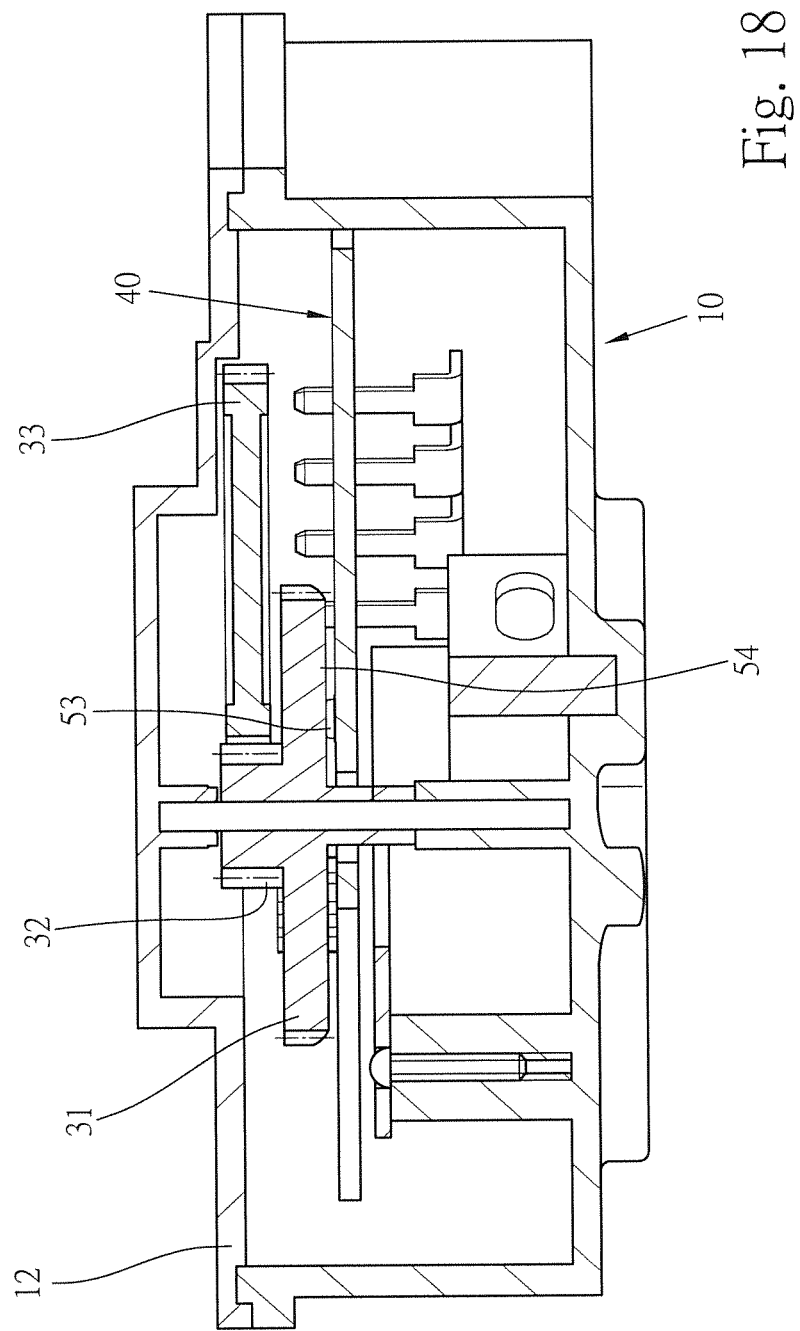
FIG. 18 is a cross sectional view of the fifth embodiment of the driving device of the present invention.

As shown in FIGS. 14 to 16 which show the fifth embodiment of the present invention wherein the circuit board 40 has a sensor 53 connected to a pre-set position thereof. The sensor 53 is a press type sensor. The first gear 31 of the gear reduction unit 30 has at least one detector 54 which is a rib-shaped detector and protrudes from one side of the first gear 31. The at least one detector 54 faces the sensor 3. As shown in FIGS. 17 and 18, when the first gear 31 of the gear reduction unit 30 is rotated, the at least one detector 54 presses the sensor 53 and the sensor 53 sends a signal to the circuit board 40.

While we have shown and described the embodiment in accordance with the present invention, it should be clear to those skilled in the art that further embodiments may be made without departing from the scope of the present invention.

What is claimed is:

1. A driving device comprising:
   a case having a room defined therein, a cover mounted to a top of the case;
   a transmission device received in the room and having a stepper motor and a gear reduction unit which includes multiple gears engaged with each other at different ratios of gears, the stepper motor driving the gear reduction unit, the gear reduction unit connected to an object;
   a circuit board received in the room and connected with the transmission device, the circuit board providing power to the stepper motor and controlling speed of the stepper motor, and
   a sensing device having a sensor and at least one detector, the sensor connected to the circuit board, the at least one detector connected to one of the gears of the gear reduction unit, when the gear reduction unit drives the at least one detector to pass the sensor, the sensor sends a signal to the circuit board and the circuit board keeps on providing the power to the stepper motor, when the gears of the gear reduction unit stop, no signal is sent to the circuit board by the sensor, the circuit board cuts off the power to the stepper motor.

2. The driving device as claimed in claim 1, wherein the sensor and the detector are mutually operated by magnetic induction.

3. The driving device as claimed in claim 1, wherein the sensor and the at least one detector are operated by magnetic induction, one of the gears of the gear reduction unit has at least one hole in which the at least one detector is installed, the at least one detector is made by magnetic material, at least one detector is threadedly connected to a threaded portion of the at least one hole.

4. The driving device as claimed in claim 1, wherein the sensor and the detector are mutually operated by optical induction.

5. The driving device as claimed in claim 1, wherein the sensor is a press type sensor, the at least one gear of the gear reduction unit has at least one detector which is a rib-shaped detector and protrudes from one side of the at least one gears, the at least one detector faces the sensor, when the at least one gear of the gear reduction unit is rotated, the at least one detector presses the sensor and the sensor sends a signal to the circuit board.

* * * * *